United States Patent
Gill

(10) Patent No.: US 6,496,335 B2
(45) Date of Patent: Dec. 17, 2002

(54) MAGNETIC HEAD SHIELD STRUCTURE HAVING HIGH MAGNETIC STABILITY

(75) Inventor: Hardayal Singh Gill, Portola Valley, CA (US)

(73) Assignee: International Business Machines Corporation, Armonk, NY (US)

(*) Notice: Subject to any disclaimer, the term of this patent is extended or adjusted under 35 U.S.C. 154(b) by 51 days.

(21) Appl. No.: 09/728,544

(22) Filed: Nov. 29, 2000

(65) Prior Publication Data

US 2002/0064002 A1 May 30, 2002

(51) Int. Cl.$^7$ ............................. G11B 5/127; G11B 5/39
(52) U.S. Cl. ........................................... 360/319
(58) Field of Search ................................. 360/319, 313, 360/110, 126, 125, 317

(56) References Cited

U.S. PATENT DOCUMENTS

| | | | | |
|---|---|---|---|---|
| 3,959,824 A | * | 5/1976 | Chi et al. | 360/121 |
| 4,814,921 A | | 3/1989 | Hamakawa et al. | 360/126 |
| 5,018,038 A | | 5/1991 | Nakanishi | 360/126 |
| 5,576,098 A | | 11/1996 | Arimoto et al. | 428/332 |
| 5,761,011 A | * | 6/1998 | Miyauchi et al. | 360/319 |
| 5,792,547 A | | 8/1998 | Liu et al. | 428/212 |
| 5,805,392 A | * | 9/1998 | Mallary et al. | 360/126 |
| 5,838,521 A | * | 11/1998 | Ravipati | 360/319 |
| 5,850,325 A | * | 12/1998 | Miyauchi et al. | 360/126 |
| 5,872,691 A | * | 2/1999 | Fukuyama et al. | 360/319 |
| 6,292,334 B1 | * | 9/2001 | Koike et al. | 360/319 |

FOREIGN PATENT DOCUMENTS

| | | |
|---|---|---|
| JP | 361099918 A | 5/1986 |
| JP | 1276606 A | 11/1989 |
| JP | 5054320 A | 3/1993 |
| JP | 407169023 A | 7/1995 |
| JP | 408036717 A | 2/1996 |
| JP | 09091625 | 4/1997 |

OTHER PUBLICATIONS

The American Physical Society, Physical Review Letters, Oscillations in Exchange Coupling and Magnetoresistance in Metallic Superlattice Structures: Co/Ru, Co/Cr, and Fe/Cr, vol. 64, No. 19, May 7, 1990.

IBM Technical Disclosure Bulletin, "Structure to Control Domain State for Improved Dynamics in Thin Film Heads", vol. 35, No. 5, Oct. 1992.

IBM Technical Disclosure Bulletin, "Laminated Shields for Thin Film Recording Heads", vol. 18, No. 4, Sep. 1975.

IBM Technical Disclosure Bulletin, "CoHfNv/A1203 Laminated Write Pole for an Integrated Spin Valve Giant Magnetoresistive Read Inductive Write Head", vol. 40, No. 04, Apr. 1997.

* cited by examiner

*Primary Examiner*—Hoa T. Nguyen
*Assistant Examiner*—Julie Anne Watko
(74) *Attorney, Agent, or Firm*—Robert O. Guillot; Intellectual Property Law Offices

(57) ABSTRACT

The hard disk drive of the present invention includes a magnetic head wherein the magnetic shields of the read head portion of the magnetic head are magnetically stabilized. Each magnetic shield is preferably fabricated as a laminated structure including a plurality of ferromagnetic material layers that are separated by spacer layers composed of a nonmagnetic material. In the preferred embodiment, the spacer layer is preferably composed of ruthenium, and the magnetic fields of the adjacent ferromagnetic layers are oppositely directed, whereby the magnetic fields within the adjacent ferromagnetic layers become antiparallel coupled. A preferred embodiment of the present invention includes NiFe ferromagnetic layers, having an alternating thickness of approximately 600 Å and approximately 100 Å, that are separated by a ruthenium spacer layer having a thickness of approximately 8 Å, such that a net magnetic moment is created within the antiparallel coupled laminated structure.

23 Claims, 3 Drawing Sheets

MAGNETIC HEAD SHIELD STRUCTURE HAVING HIGH MAGNETIC STABILITY

BACKGROUND OF THE INVENTION

1. Field of the Invention

The present invention relates generally to the fabrication of magnetic heads for hard disk drives, and particularly to the fabrication of magnetic shields for the read head portions of such magnetic heads.

2. Description of the Prior Art

To increase the areal data storage density of hard disks for hard disk drives, the data tracks upon such hard disks are written closer together, such that a greater number of tracks per inch are recorded. To efficiently read data from a data track, the read head portion of a magnetic head of a hard disk drive must be shielded from extraneous magnetic fields, such as those generated by adjacent data tracks, commonly known as side reading effects, and magnetic shields are provided in magnetic head designs to provide such magnetic shielding for the read head active components.

Such prior art magnetic shields typically consist of a single thin film layer of ferromagnetic material, such as NiFe. However, because these prior art magnetic shields are single layer elements, magnetic edge effects, as are known to those skilled in the art, exist to cause the magnetic fields within the shields to separate into a plurality of magnetic domains. Such domains have magnetic fields of varying strengths and directions within the shield, such that domain boundaries are created between the magnetic domains in the shield layer. These domain boundaries and the magnetic fields within the various domains, move under the influence of external fields, such as are created from adjacent data tracks. These shifting magnetic fields within the shield itself are detectable by the sensitive active layers of the read head, and contribute to the background noise in the read head signal.

The present invention seeks to solve this problem by stabilizing the magnetic fields within the magnetic shields of the read heads, such that side reading is minimized, noise is reduced and the signal to noise ratio of the magnetic head is thereby increased.

SUMMARY OF THE INVENTION

The hard disk drive of the present invention includes a magnetic head wherein the magnetic shields of the read head portion of the magnetic head are magnetically stabilized. Each magnetic shield is preferably fabricated as a laminated structure including a plurality of ferromagnetic material layers that are separated by spacer layers composed of a nonmagnetic material. In the preferred embodiment, the spacer layer is preferably composed of ruthenium, and the magnetization of the adjacent ferromagnetic layers is oppositely directed, whereby the magnetization within the adjacent ferromagnetic layers becomes antiparallel coupled. Due to the coupling, the magnetic fields in the ferromagnetic layers establish single domain states having flux closed ends, and the laminated shield structure has stabilized magnetic field properties. A preferred embodiment of the present invention includes NiFe ferromagnetic layers, having an alternating thickness of approximately 600 Å and approximately 100 Å, that are separated by a ruthenium spacer layer having a thickness of approximately 8 Å. The laminated magnetic shields of the present invention may be utilized in merged magnetic heads as well as magnetic heads having separate read head and write head portions.

It is an advantage of the magnetic head of the present invention that it produces a read signal with reduced background noise.

It is another advantage of the magnetic head of the present invention that the magnetic shields of the read head are magnetically stabilized.

It is a further advantage of the magnetic head of the present invention that the magnetic shields of the read head have single domain magnetic fields.

It is an advantage of the hard disk drive of the present invention that it includes a magnetic head having a read head with reduced side reading problems, such that hard disks having an increased number of tracks per inch can be read effectively.

It is another advantage of the hard disk drive of the present invention that it includes a magnetic head of the present invention that it has a read signal with reduced noise.

It is a further advantage of the hard disk drive of the present invention that it includes a magnetic head of the present invention wherein the magnetic shields of the read head are magnetically stabilized.

It is yet another advantage of the hard disk drive of the present invention that it includes a magnetic head of the present invention wherein the magnetic shields of the read head have single domain magnetic fields.

These and other features and advantages of the present invention will no doubt become apparent to those skilled in the art after having read the following detailed description which makes reference to the several figures of the drawings.

IN THE DRAWINGS

DETAILED DESCRIPTION OF THE PREFERRED EMBODIMENTS

Figure 1:
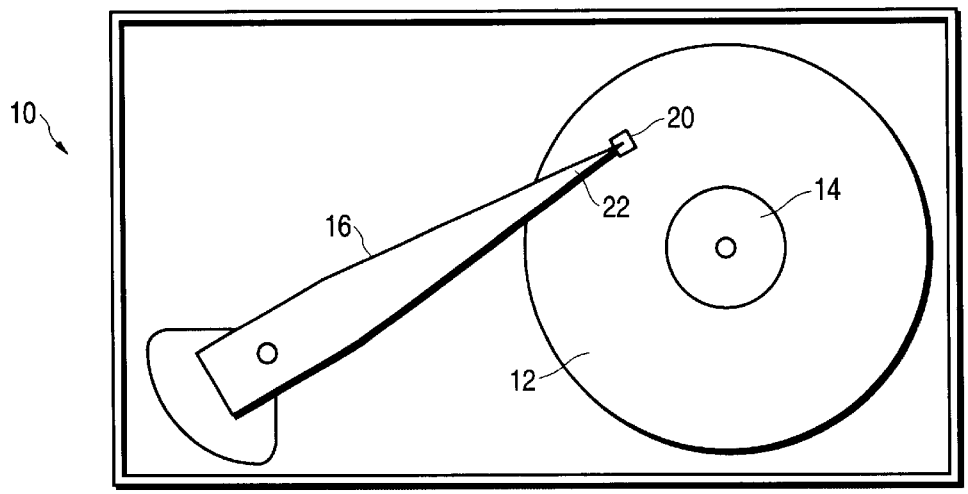
FIG. 1 is a top plan view of a typical hard disk drive including a magnetic head of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. an actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

Figure 2:
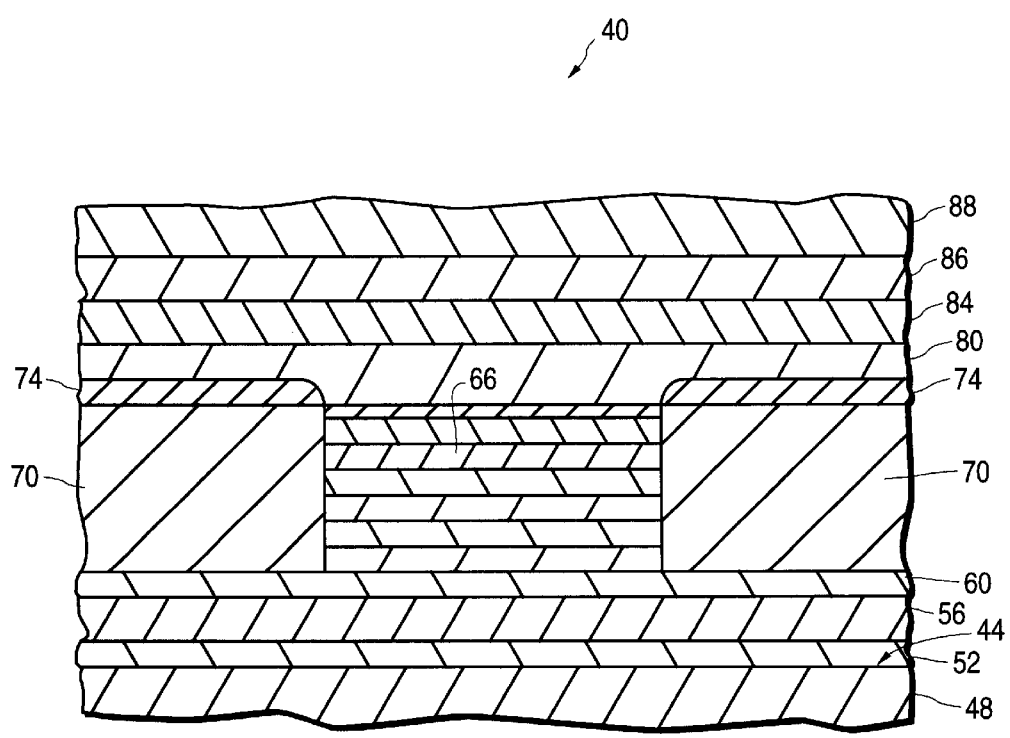
FIG. 2 is a side cross-sectional view of a prior art read head portion of a magnetic head.

To facilitate the understanding of the present invention, a cross-sectional view of a prior art read head portion 40 of a magnetic head is presented in FIG. 2. As is well known to those skilled in the art, the prior art read head structure 40 is fabricated utilizing thin film deposition techniques on an upper surface 44 of a wafer substrate 48. In fabricating the read head portion 40 of the prior art magnetic head, a first electrical insulation layer 52 is deposited upon the surface 44 of the substrate 48, followed by the deposition of a first magnetic shield 56, followed by a second electrical insulation layer 60, followed by the fabrication of a plurality of layers and structures that generally include a plurality of active read head magnetic layers 66, magnetic hard bias elements 70 and electrical lead traces 74. Thereafter, a third insulation layer 80 is deposited, followed by a second magnetic shield 84, another insulation layer 86, and further magnetic head components (not shown), such as write head structures, that complete the magnetic head. In some prior art magnetic head designs, the second magnetic shield 84 may also function as one of the magnetic poles of the write head structure.

A problem that exists with the prior art magnetic shields 56 and 84 is that they are not magnetically stable. That is, each shield 56 and 84 is fabricated as a single layer of a relatively magnetically soft ferromagnetic material such as a NiFe alloy with a net magnetic moment. That is, the shields are preferably not fabricated with a zero magnetization, but rather with a net directional magnetization which serves to provide magnetic shielding for the read head components 66. However, due to magnetic shield edge effects and other phenomena, a plurality of magnetic domains typically become created within each shield, as is known to those skilled in the art. The localized magnetization in each domain has a different direction, and domain walls or boundaries then exist within each shield. Thereafter, as external magnetic fields are encountered by the shields, the magnetic domain boundaries move as the magnetization within the domains shift. The shifting magnetization within the shield are then detected by the read head elements 66 and become unwanted background noise in the prior art read head signal. The present invention seeks to eliminate this problem by stabilizing the magnetization within the magnetic shield through the fabrication of a multilayer antiparallel coupled magnetic shield structure, as is described herebelow with the aid of FIGS. 3, 4 and 5.

Figure 3:
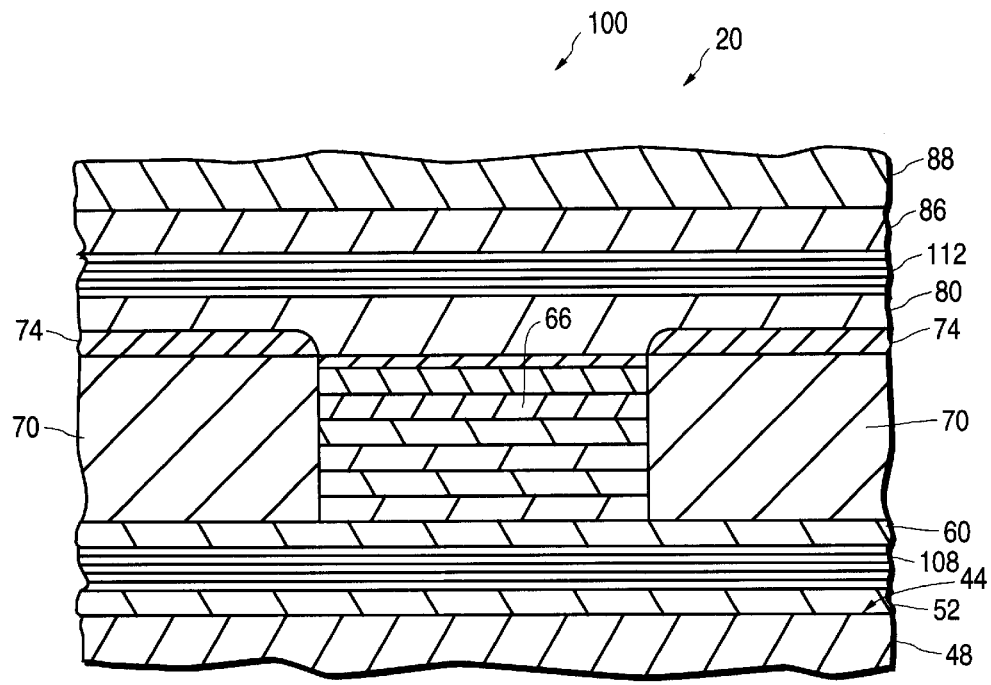
FIG. 3 is a side cross-sectional view of a read head portion of a magnetic head of the present invention.

FIG. 3 is a side cross-sectional view of a read head portion 100 of the magnetic head of the present invention which can serve as the magnetic head 20 of the hard disk drive 10 of FIG. 1. As depicted in FIG. 3, the read head structure 100 of the present invention includes several features that may be substantially identical to features of the prior art read head 40, and such substantially identical features are identically numbered. The read head 100 of the present invention includes a first insulation layer 52 that is fabricated upon the surface 44 of a wafer substrate 48. A first magnetic shield structure 108 of the present invention is fabricated upon the insulation layer 52 and a second insulation layer 60 is thereafter fabricated upon the first magnetic shield 108. The active read head components, including the magnetoresistive head layers 66, the magnetic hard bias elements 70, the electrical leads 74 and third insulation layer 80 are then fabricated. A second magnetic shield structure 112 is then fabricated upon the insulation layer 80, and further thin film structures as are known in the art to create a magnetic head, such as insulation layer 86 and write head elements including a first magnetic pole 88, are thereafter fabricated upon the second shield structure 112. In the preferred embodiment depicted in FIG. 3, each of the magnetic shields 108 and 112 is a multilayered structure, as is described herebelow with reference to FIG. 4. However, the present invention is not to be limited to a read head in which both shields 108 and 112 are formed as the multilayered structures. That is, the present invention and the following claims, are intended to include read head structures wherein either shield 108 or 112, as well as both shields (108 and 112) are formed as the multilayered structures that are next described with the aid of FIG. 4.

Figure 4:
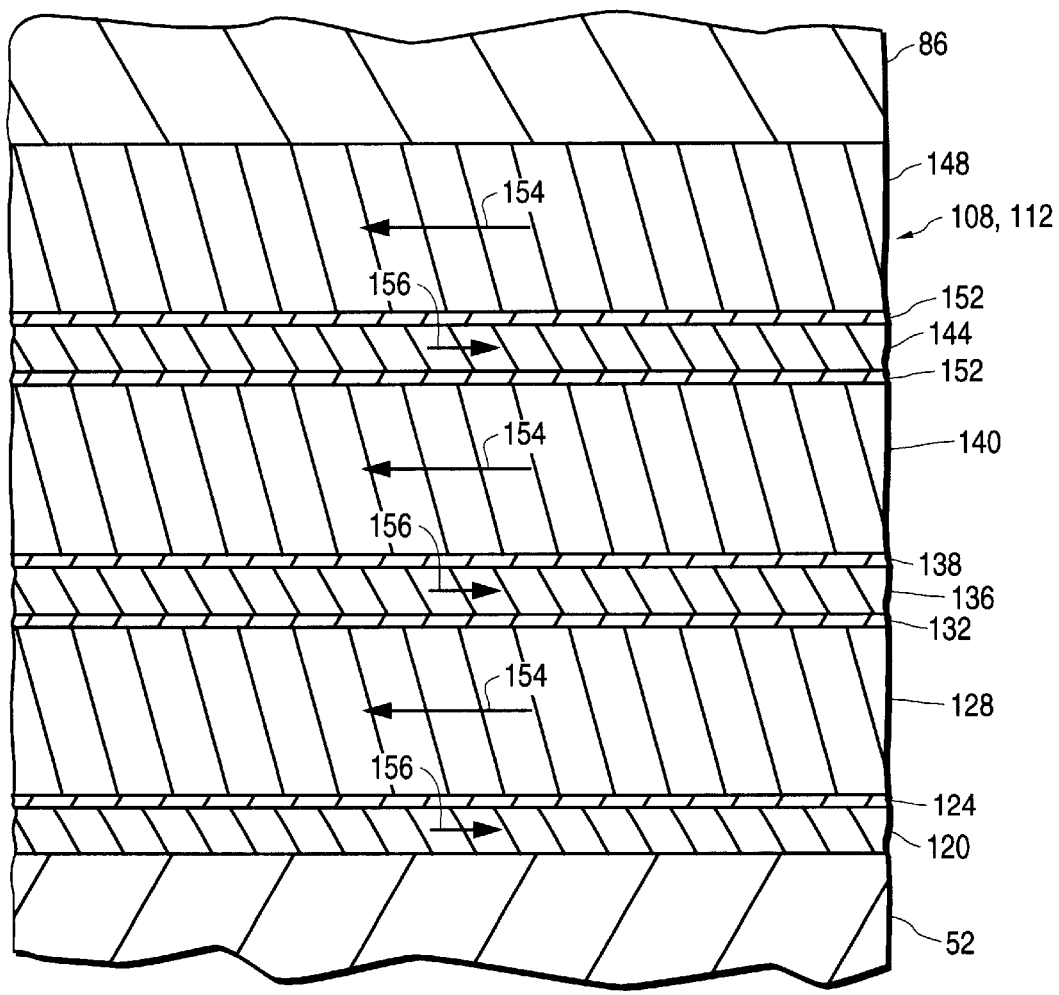
FIG. 4 is an enlarged cross-sectional view of a read head shield of the present invention.

FIG. 4 is a side cross-sectional view of a multilayered magnetic shield structure of the present invention, which can be utilized as magnetic shield 108 and/or 112 of the magnetic head 20 depicted in FIG. 3, and for ease of description it will be simply identified as magnetic shield structure 108. The magnetic shield structure 108 basically includes a plurality of ferromagnetic layers that are separated by spacer layers. Specifically, a first ferromagnetic layer 120 is fabricated upon an insulation layer, such as insulation layer 52. Thereafter, a relatively thin spacer layer 124 is fabricated upon the first ferromagnetic layer 120. A second ferromagnetic layer 128 is then fabricated upon spacer layer 124, followed by a second spacer layer 132, followed by another ferromagnetic layer 136, followed by another spacer layer 138, followed by another ferromagnetic layer 140. Further ferromagnetic layers 144 and 148, separated by spacer layers 152, and still further layers (not shown) such as 144, 148 and 152 may be fabricated and are included within the scope of the invention. The magnetic shield 108 is therefore preferably fabricated such that the first layer and final layer are composed of ferromagnetic material. In the preferred embodiment, the ferromagnetic material layers are comprised of a relatively magnetically soft material such as a nickel iron alloy, such as NiFe 80/20 known as Permalloy, although other ferromagnetic materials can be utilized. The spacer layers are comprised of a non-magnetic material which contributes to the coupling of magnetization in the ferromagnetic layers that are separated by the spacer layer. In the preferred embodiments, the spacer layers are preferably composed of ruthenium, however, copper has been found to act as an acceptable spacer layer material.

In the preferred embodiment, the thickness of the ferromagnetic layers, as well as the spacer layers is chosen to provide stable magnetic field properties to the magnetic shield 108. In a preferred shield embodiment 108, a first NiFe layer 120 is formed with a thickness of approximately 100 Å, a Ru spacer layer 124 is fabricated with a thickness of approximately 8 Å, a second NiFe layer 128 is formed with a thickness of 600 Å, a second Ru spacer layer 132 is formed with a thickness of approximately 8 Å, a third NiFe layer 136 is fabricated with a thickness of approximately 100 Å, a third Ru spacer layer 138 has a thickness of approximately 8 Å and a fourth NiFe layer 140 is fabricated with a thickness of approximately 600 Å. Further pairs of thin layers 144 and thick layers 148 separated by spacer layers 152 are contemplated. It is therefore seen that the magnetic shield structure 108 is preferably formed with alternating thicker and thinner ferromagnetic material layers separated by spacer layers. As each of the ferromagnetic layers is fabricated, a magnetic field is applied in the fabrication process, such that the layer is formed with a directional magnetization, and the thickness of each layer contributes to the overall strength of the directional magnetization of the layer. Therefore, as depicted in FIG. 4, relatively thick layers 128, 140, 148 are is formed with a leftward magnetization (arrow 154), and relatively thin layers 120, 136, 444 are formed with a somewhat weaker rightward magnetization (arrow 156). Therefore, the magnetic shield 108 will possess a net magnetization in the leftward direction. The strength of the net magnetization is a matter of design choice and it is affected by parameters such as the number of fabricated layers, as well as the thickness and magnetization strength of each of the individual layers.

Significantly, the spacer layers 124, 132, 138, 152 are present to create magnetization stabilization by providing a strong antiferromagnetic coupling between the adjacent ferromagnetic layers. For instance, spacer layer 124 is present to provide antiferromagnetic coupling between ferromagnetic layers 120 and 128. As is known and understood by those skilled in the art, where the magnetization of the layers 120 and 128 are coupled through a spacer layer such as layer 124, the magnetic fields in each of the layers 120 and 128 become established in single domain states, the magnetic fields at the shield edges become flux closed, and the overall magnetic fields of the coupled layers are thereby stabilized. Therefore, the shield 108 provides shielding of the read head active elements 66 from external magnetic fields, while the layers of the shield itself are magnetically structured in pinned single domain states. The shield 108 thus does not have the multiple domain boundaries of the prior art magnetic shields which are subject to movement due to external magnetic fields such as from adjacent data tracks), and which create the noise problems of the prior art. Therefore, the magnetic shield structure 108 thus of the present invention provides reduced noise, such that the signal to noise ratio (SNR) of the magnetic head of the present invention is increased.

While alternating ferromagnetic layer thicknesses of 600 Å and 100 Å have been described hereabove, the present invention is not to be so limited, and generally, ferromagnetic layer thicknesses in the range of from 50 Å to 1,000 Å can provide suitable results. Likewise, while a spacer layer thickness of approximately 8 Å is described hereabove, the invention is not to be so limited, and spacer layers having a thickness of from 4 Å to 10 Å, or even greater, can provide excellent results. The preferred magnetic head of the present invention has 20 to 40 laminations (alternating layer combinations (120, 124, 128, 132). However, the thickness of the various layers, and the number of laminations of layers is a matter of design choice, as will be understood by those skilled in the art having read and understood this invention description.

Figure 5:
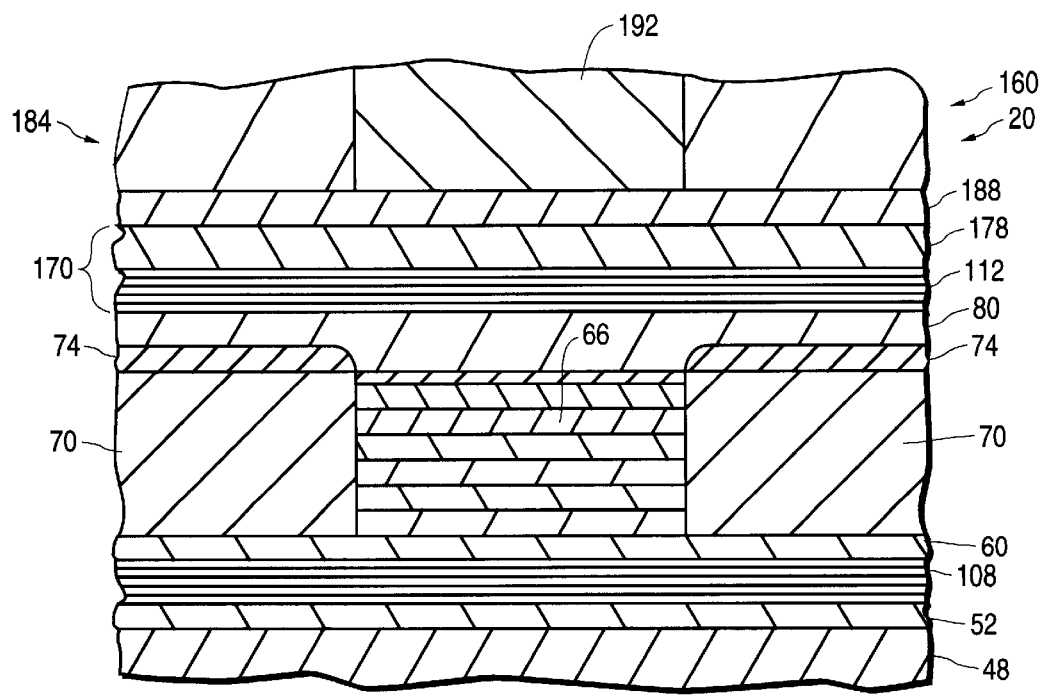
FIG. 5 is a cross-sectional view of an alternative read head structure of a magnetic head of the present invention.

FIG. 5 depicts another magnetic head 20 of the present invention having an alternative read head design 160, with particular regard to the second magnetic shield. As depicted in FIG. 5, the read head structure 160 is a design that is commonly termed a merged head, in which the second magnetic shield of the read head also serves as the first magnetic pole of the write head, as is known to those skilled in the art. Specifically, as depicted in FIG. 5, the merged read head structure 160 of the magnetic head 20 includes many components that have been described hereabove, and such components are identified with identical numbers. The merged head 160 of the present invention includes a first insulation layer 52 that is formed upon a surface 44 of a wafer substrate 48. A first magnetic shield, which may be the magnetic shield 108 of the present invention, or a magnetic shield 56 of the prior art, is deposited upon the insulation layer 52. A second insulation layer 60 is fabricated upon the first magnetic shield, followed by the active read head elements including the magnetoresistive layer 66, the magnetic hard bias elements 70, and the electrical leads 74. A third insulation layer 80 is next deposited. Thereafter, a merged shield/pole 170 is fabricated as follows. Initially, a plurality of thin film ferromagnetic layers with alternating spacer layers are fabricated to create a second shield structure 112, as described in detail hereabove with regard to FIG. 4. The alternating spacer layers 124, 132, 138, 152 act to create an antiferromagnetic coupled magnetic shield structure having the desirable stabilized magnetic field properties described hereabove, and 20 to 40 laminations of the shield layers are preferred. Thereafter, a significantly thicker ferromagnetic material layer 178 is deposited upon the laminated shield structure 112 with a thickness of approximately 2 $\mu$m. The thicker ferromagnetic layer 178 is preferably composed of a ferromagnetic material, such as Permalloy, and it serves as the P1 pole of the write head portion 184 of the merged head. A write gap layer 188 and a P2 pole tip 192 are thereafter fabricated on top of the P1 pole portion 178 of the merged shield/pole 170. As will be understood by those skilled in the art, the combined shield/pole structure 170 includes a laminated shield portion 112 of the present invention with its antiferromagnetically coupled layers and pinned magnetic fields, as well as a P1 pole layer 178 that facilitates the flow of magnetic flux through the write head poles and across the write gap of the write head. The detailed process steps in fabricating the write head portion 184 are many, varied, and known to those skilled in the art, such that a detailed description thereof is deemed unnecessary herein. With regard to the shield/pole structure 170, the fabrication thereof omits the step of fabricating the insulation layer 86 between a separate second shield 112 and P1 pole layer 88, of a magnetic head, such as is described hereabove with regard to FIG. 3.

In fabricating a laminated magnetic shield 108 of the present invention, it is significant to note that a NiFe ferromagnetic layer may be fabricated by sputter deposition or electroplating, whereas a ruthenium spacer layer is fabricated by sputtering, and a copper spacer layer can be fabricated by sputtering or electroplating. Therefore, where a preferred ruthenium spacer layer is utilized, the shield 108 is preferably fabricated by the sputter deposition of the ferromagnetic layers that is interspersed with the sputter deposition of the ruthenium spacer layer. A shield 108 that includes copper spacer layers can be fabricated by sputter deposition or, alternatively, it can be fabricated by electroplating in that the copper spacer layer can be electroplated as well as the NiFe ferromagnetic layers.

While the invention has been shown and described with reference to certain preferred embodiments, it will be understood by those skilled in the art that various alterations in form and detail may be made therein without departing from the true spirit and scope of the invention. It is therefore intended that the following claims cover all such alterations and modifications in form and detail that nevertheless include the true spirit and scope of the invention.

I claim:

1. A magnetic head, comprising:
   a read head portion having at least one magnetic shield, wherein said magnetic shield includes a plurality of ferromagnetic material layers and at least one spacer layer, wherein said spacer layer is disposed between two said ferromagnetic layers; and wherein said magnetic shield is fabricated with a net magnetic moment.

2. A magnetic head as described in claim 1 wherein said ferromagnetic layers that are separated by a spacer layer have oppositely directed magnetic fields.

3. A magnetic head as described in claim 1 wherein said ferromagnetic layers that are separated by a spacer layer have differing thicknesses.

4. A magnetic head as described in claim 3 wherein at least two thick ferromagnetic layers and at least two thin ferromagnetic layers are provided, and wherein a spacer layer is disposed between each said ferromagnetic layer.

5. A magnetic head as described in claim 3 wherein said ferromagnetic layers have thicknesses in the range of approximately 50 Å to approximately 1,000 Å.

6. A magnetic head as described in claim 3 wherein said ferromagnetic layers have alternating thicknesses of approximately 600 Å and approximately 100 Å.

7. A magnetic head as described in claim 1 wherein ferromagnetic layers that are separated by a spacer layer have coupled magnetic fields.

8. A magnetic head as described in claim 1 wherein ferromagnetic layers that are separated by a spacer layer have a flux closed magnetic field structure.

9. A magnetic head as described in claim 1 wherein said ferromagnetic layers are comprised of a NiFe alloy.

10. A magnetic head as described in claim 1 wherein said spacer layers are comprised of a substance chosen from the group consisting of Ru and Cu.

11. A magnetic head as described in claim 1 wherein said spacer layers have a thickness of from approximately 4 Å to approximately 10 Å.

12. A magnetic head as described in claim 11 wherein said spacer layers have a thickness of approximately 8 Å.

13. A magnetic head as described in claim 1 wherein from approximately 20 to approximately 40 laminations are formed, wherein a lamination includes a thin ferromagnetic layer, a spacer layer, a thick ferromagnetic layer and a second spacer layer.

14. A magnetic head including a read head portion comprising:

a first magnetic shield structure formed above a substrate base;

a magnetoresistive read head structure;

a second magnetic shield structure formed above said magnetoresistive read head structure;

wherein at least one of said first and second magnetic shield structures includes a plurality of ferromagnetic material layers and at least one spacer layer, wherein said spacer layer is disposed between two said ferromagnetic layers; and wherein said ferromagnetic layers that are separated by said spacer layer have differing thicknesses and oppositely directed magnetic fields, such that said magnetic shield is fabricated with a net magnetic moment.

15. A magnetic head as described in claim 14 wherein at least two thick ferromagnetic layers and at least two thin ferromagnetic layers are provided, wherein a spacer layer is disposed between each said ferromagnetic layer, and wherein ferromagnetic layers that are separated by a spacer layer have coupled magnetic fields.

16. A magnetic head as described in claim 15 wherein said ferromagnetic layers are comprised of a NiFe alloy, and have thicknesses in the range of approximately 50 Å to approximately 1,000 Å, and wherein said spacer layers are comprised of a substance chosen from the group consisting of Ru and Cu, and wherein said spacer layers have a thickness of from approximately 4 Å to approximately 10 Å.

17. A magnetic head as described in claim 16 wherein said ferromagnetic layers have alternating thicknesses of approximately 600 Å and approximately 100 Å and wherein said spacer layers have a thickness of approximately 8 Å.

18. A magnetic head as described in claim 17 wherein approximately 20 to approximately 40 laminations are formed, wherein a lamination includes a thin ferromagnetic layer, a spacer layer, a thick ferromagnetic layer and a second spacer layer.

19. A hard disk drive, including at least one magnetic head having a read head portion, comprising:

a first magnetic shield structure formed above a substrate base;

a magnetoresistive read head structure;

a second magnetic shield structure formed above said magnetoresistive read head structure;

wherein at least one of said first and second magnetic shield structures includes a plurality of ferromagnetic material layers and at least one spacer layer, wherein said spacer layer is disposed between two said ferromagnetic layers; and wherein said ferromagnetic layers that are separated by said spacer layer have differing thicknesses and oppositely directed magnetic fields, such that said magnetic shield is fabricated with a net magnetic moment.

20. A hard disk drive as described in claim 19 wherein at least two thick ferromagnetic layers and at least two thin ferromagnetic layers are provided, wherein a spacer layer is disposed between each said ferromagnetic layer, and wherein ferromagnetic layers that are separated by a spacer layer have coupled magnetic fields.

21. A hard disk drive as described in claim 20 wherein said ferromagnetic layers are comprised of a NiFe alloy, and have thicknesses in the range of approximately 50 Å to approximately 1,000 Å, and wherein said spacer layers are comprised of a substance chosen from the group consisting of Ru and Cu, and wherein said spacer layers have a thickness of from approximately 4 Å to approximately 10 Å.

22. A hard disk drive as described in claim 21 wherein said ferromagnetic layers have alternating thicknesses of approximately 600 Å and approximately 100 Å and wherein said spacer layers have a thickness of approximately 8 Å.

23. A hard disk drive as described in claim 22 wherein approximately 25 to approximately 40 laminations are formed, wherein a lamination includes a thin ferromagnetic layer, a spacer layer, a thick ferromagnetic layer and a second spacer layer.

\* \* \* \* \*